United States Patent
Wodausch et al.

(10) Patent No.: US 10,746,136 B2
(45) Date of Patent: Aug. 18, 2020

(54) METHOD FOR INCREASING THE QUANTITY OF PURGING AIR IN THE TANK VENTING SYSTEM BY COMPLETELY BLOCKING THE INJECTION OF AT LEAST ONE CYLINDER

(71) Applicant: Volkswagen AG, Wolfsburg (DE)

(72) Inventors: Jens Wodausch, Braunschweig (DE); Florian Zink, Gifhorn (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 330 days.

(21) Appl. No.: 15/891,000

(22) Filed: Feb. 7, 2018

(65) Prior Publication Data

US 2018/0223775 A1    Aug. 9, 2018

(30) Foreign Application Priority Data

Feb. 7, 2017  (DE) .................. 10 2017 102 367

(51) Int. Cl.
*F02M 25/08*  (2006.01)
*F02M 35/10* (2006.01)
(Continued)

(52) U.S. Cl.
CPC ..... *F02M 25/0836* (2013.01); *F02D 41/0002* (2013.01); *F02D 41/0042* (2013.01);
(Continued)

(58) Field of Classification Search
CPC ... F02D 41/0002; F02D 41/0032–0045; F02D 2250/41; F02D 41/0042; F02D 19/0621; F02M 25/08–089
(Continued)

(56) References Cited

U.S. PATENT DOCUMENTS 5,216,997 A * 6/1993 Osanai .................. F02D 41/004
123/198 DB
5,368,002 A * 11/1994 Hoshino ............. F02D 41/0045
123/198 D
(Continued)

FOREIGN PATENT DOCUMENTS

DE  10 2008 042 638 A1   4/2010
EP      2 530 262 A1    12/2012

OTHER PUBLICATIONS

Search report for German Patent Application No. 10 2017 102 367.4, dated Sep. 15, 2017.

*Primary Examiner* — Mark A Laurenzi
*Assistant Examiner* — Mickey H France
(74) *Attorney, Agent, or Firm* — Pearl Cohen Zedek Latzer Baratz LLP

(57) ABSTRACT

A method for operating an internal combustion engine which has a number of cylinders and which comprises a fuel system and a fresh air system, whereby fuel is fed in a fuel mass flow via a fuel supply line of the fuel system to the cylinders at a prescribable air-fuel ratio directly by means of the injectors, and fresh air is fed in a fresh air mass flow via a fresh air system, whereby the fuel system comprises a tank venting system with a tank venting line that has a tank venting valve and that, via the interconnected tank venting valve, is connected to at least one line section of the fresh air system via at least one feed point, thereby forming at least one venting path, whereby, owing to a pressure which prevails at the at least one feed point and which is negative relative to the tank venting line and dependent on the load point, the fuel tank of the tank venting system is vented via the at least one venting path, a venting process in which a purging air mass flow containing fuel is removed from the tank venting system and fed to the cylinders as a portion of the fresh air mass flow, so that a total fuel mass flow is fed (Continued)

into the cylinders directly by means of the injectors of the fuel system as well as indirectly via the fresh air mass flow. It is provided that the direct feed of fuel by means of the injector of at least one of the cylinders is blocked, as a result of which a purging air mass flow comprising the fuel volume equivalent that is now absent due to the blocking of the at least one cylinder can advantageously be removed from the tank venting line, while maintaining the prescribed air-fuel ratio via the at least one venting path at the at least one feed point, and this purging air mass flow can be fed as a portion of the fresh air mass flow to the cylinder(s) that is/are still being supplied with fuel.

12 Claims, 2 Drawing Sheets

(51) Int. Cl.
  *F02D 41/00* (2006.01)
  *F02D 41/40* (2006.01)
  *F02D 41/08* (2006.01)
  *F02D 41/38* (2006.01)
(52) U.S. Cl.
  CPC ......... *F02D 41/0087* (2013.01); *F02D 41/08* (2013.01); *F02D 41/40* (2013.01); *F02M 25/0872* (2013.01); *F02M 35/10157* (2013.01); *F02D 41/0007* (2013.01); *F02D 41/38* (2013.01); *F02D 2041/389* (2013.01); *F02M 25/089* (2013.01); *Y02T 10/144* (2013.01)
(58) Field of Classification Search
  USPC ........ 123/516, 518–521, 572, 573; 60/605.1, 60/598
  See application file for complete search history.

(56) References Cited

U.S. PATENT DOCUMENTS

| | | | | |
|---|---|---|---|---|
| 5,562,083 | A * | 10/1996 | Osanai | F02D 41/0032 123/519 |
| 5,680,849 | A * | 10/1997 | Morikawa | F02D 41/0042 123/198 D |
| 5,685,285 | A * | 11/1997 | Ohtani | F02D 41/0045 123/698 |
| 5,746,187 | A | 5/1998 | Ninomiya et al. | |
| 5,778,859 | A * | 7/1998 | Takagi | F02D 41/0032 123/520 |
| 6,148,803 | A * | 11/2000 | Majima | F02M 25/0809 123/520 |
| 6,173,703 | B1 * | 1/2001 | Matsumoto | F02D 41/0045 123/674 |
| 6,820,597 | B1 * | 11/2004 | Cullen | F02D 17/02 123/516 |
| 7,150,265 | B2 * | 12/2006 | Shibagaki | F02D 41/221 123/406.47 |
| 2001/0011540 | A1 * | 8/2001 | Mashiki | F02D 41/0045 123/520 |
| 2001/0032637 | A1 * | 10/2001 | Grieve | F02D 41/0045 123/674 |
| 2004/0237514 | A1 * | 12/2004 | Surnilla | F02D 17/02 60/299 |
| 2004/0261765 | A1 * | 12/2004 | Osanai | F02D 41/0045 123/325 |
| 2005/0022797 | A1 * | 2/2005 | Ikemoto | F02D 41/0032 123/673 |
| 2005/0121977 | A1 * | 6/2005 | Watanabe | B60R 25/042 307/10.5 |
| 2005/0183698 | A1 * | 8/2005 | Yonezawa | F02D 35/0046 123/431 |
| 2005/0193718 | A1 * | 9/2005 | Surnilla | F02D 41/0082 60/285 |
| 2005/0193719 | A1 * | 9/2005 | Sumilla | F02D 41/0082 60/285 |
| 2005/0193720 | A1 * | 9/2005 | Surnilla | F02D 41/0082 60/285 |
| 2005/0193721 | A1 * | 9/2005 | Surnilla | F02D 41/0087 60/285 |
| 2005/0193980 | A1 * | 9/2005 | Doering | F01N 3/0814 123/406.47 |
| 2005/0193986 | A1 * | 9/2005 | Cullen | F02D 41/0082 123/478 |
| 2005/0193987 | A1 * | 9/2005 | Doering | F02D 17/02 123/479 |
| 2005/0193988 | A1 * | 9/2005 | Bidner | F01L 13/00 123/481 |
| 2005/0193997 | A1 * | 9/2005 | Cullen | F02D 41/0087 123/698 |
| 2005/0197236 | A1 | 9/2005 | Doering | |
| 2005/0197759 | A1 * | 9/2005 | Surnilla | F02P 5/1504 701/103 |
| 2005/0197761 | A1 * | 9/2005 | Bidner | F02P 5/045 701/105 |
| 2005/0274353 | A1 * | 12/2005 | Okubo | F02D 41/0042 123/299 |
| 2005/0284445 | A1 * | 12/2005 | Ozaki | F02D 41/0032 123/325 |
| 2006/0031000 | A1 * | 2/2006 | Amano | F02D 41/0045 701/114 |
| 2007/0186910 | A1 * | 8/2007 | Leone | F02M 25/08 123/520 |
| 2009/0000276 | A1 * | 1/2009 | Hokuto | F02D 41/0045 60/285 |
| 2009/0070005 | A1 * | 3/2009 | Kim | F02D 41/0042 701/103 |
| 2014/0230795 | A1 | 8/2014 | Jentz et al. | |
| 2015/0219045 | A1 * | 8/2015 | Aso | F02M 37/0082 123/495 |
| 2016/0069303 | A1 * | 3/2016 | Pursifull | F02M 25/0836 701/103 |
| 2016/0201615 | A1 | 7/2016 | Pursifull et al. | |
| 2016/0230681 | A1 * | 8/2016 | Tanaka | F02M 25/0836 |
| 2016/0230707 | A1 * | 8/2016 | Tanaka | F02M 25/0836 |
| 2016/0237926 | A1 * | 8/2016 | Tanaka | F02D 41/1454 |
| 2016/0298554 | A1 * | 10/2016 | Bandyopadhyay | F02M 25/0836 |
| 2016/0305352 | A1 * | 10/2016 | Pursifull | F02D 41/0007 |
| 2017/0009673 | A1 * | 1/2017 | Dudar | F02D 41/004 |
| 2017/0082043 | A1 * | 3/2017 | Dudar | F02D 41/0035 |
| 2017/0122227 | A1 * | 5/2017 | Rollinger | F02D 31/001 |
| 2017/0363055 | A1 * | 12/2017 | Dudar | F02D 41/22 |
| 2018/0171896 | A1 * | 6/2018 | Iihoshi | B60W 10/02 |
| 2018/0171914 | A1 * | 6/2018 | Ulrey | F01N 3/10 |
| 2018/0195451 | A1 * | 7/2018 | Matohara | F02D 41/04 |
| 2018/0291830 | A1 * | 10/2018 | Kurosawa | F02D 41/22 |

\* cited by examiner

METHOD FOR INCREASING THE QUANTITY OF PURGING AIR IN THE TANK VENTING SYSTEM BY COMPLETELY BLOCKING THE INJECTION OF AT LEAST ONE CYLINDER

CROSS-REFERENCE TO RELATED APPLICATIONS

This application claims priority from German Patent Application No. 10 2017 102 367.4, filed Feb. 7, 2017, which is hereby incorporated by reference.

BACKGROUND OF THE INVENTION

The invention relates to a method for operating an internal combustion engine which has a number of cylinders and which comprises a fuel system and a fresh air system, whereby fuel is fed in a fuel mass flow via a fuel supply line of the fuel system to the cylinders at a prescribable air-fuel ratio directly by means of the injectors, and fresh air is fed in a fresh air mass flow via a fresh air system, whereby the fuel system comprises a tank venting system with a tank venting line that has a tank venting valve and that, via the interconnected tank venting valve, is connected to at least one line section of the fresh air system via at least one feed point, thereby forming at least one venting path.

German patent application DE 10 2008 042 638 A1 discloses a method for operating an internal combustion engine, whereby a crankcase of the internal combustion engine has a venting system in the intake system of the internal combustion engine. When fuel is outgassed from engine oil that is present in the crankcase, the operating point of the internal combustion engine is changed so as not to fall below a prescribable air-fuel ratio. Therefore, a crankcase venting system is being put forward with which gases are conveyed from the crankcase into the intake pipe and thus into the intake system of the internal combustion engine. In this context, it is provided, for example, to select an operating point for the air-fuel ratio—especially the rich-running limit—that has a fuel consumption that is as high as possible. The outgassing of fuel can be ascertained by monitoring and measuring the lambda value control since it can be noted that the fuel-air mixture becomes richer during the outgassing. In summary, it is provided that the load point of the internal combustion engine should be raised in order to allow a higher purging rate of fuel gases, whereby a minimum injection time is explicitly cited as the existing limit of the fuel mass flow.

European patent application EP 2 530 262 A1 discloses a control unit for an internal combustion engine in which a fuel gas is returned to the intake system. In the associated method, $NO_x$ is measured and then returned to the intake system parallel to the fuel gas. In this process, the lambda value control serves to evaluate and regulate the mass flows.

U.S. Pat. No. 5,746,187 A describes a tank venting system. A method is disclosed that controls the mass flow rate of the tank venting volumetric flow. In this process, the lambda value control likewise serves to monitor the purging quantity, whereby the injected quantity or the actuation angle of the tank venting valve is appropriately adjusted.

Before the backdrop of the state of the art, the objective of the invention is to offer a solution that allows the purging air mass flow of the tank venting system to be increased, whereby, if at all possible, no additional components are needed that would have to be additionally integrated into the tank venting system of a fuel system.

SUMMARY OF THE INVENTION

The starting point of the invention is a method for operating an internal combustion engine which has a number of cylinders and which comprises a fuel system and a fresh air system, whereby fuel is fed in a fuel mass flow via a fuel supply line of the fuel system into the cylinders at a prescribable air-fuel ratio directly by means of the injectors, and fresh air is fed in a fresh air mass flow via a fresh air system.

The fuel system comprises a tank venting system with a tank venting line that has a tank venting valve and that, via the interconnected tank venting valve, is connected to at least one line section of the fresh air system via at least one feed point, thereby forming at least one venting path.

Owing to a pressure which prevails at the at least one feed point and which is negative relative to the tank venting line and dependent on the load point, the fuel tank of the tank venting system is vented via the at least one venting path, a venting process in which a purging air mass flow containing fuel is removed from the tank venting system and fed to the cylinders as a portion of the fresh air mass flow, so that a total fuel mass flow is fed into the cylinders directly by means of the injectors of the fuel system as well as indirectly via the fresh air mass flow.

According to the invention, it is provided that the direct feed of fuel by means of the injector of at least one of the cylinders is blocked, as a result of which a purging air mass flow comprising the fuel volume equivalent that is now absent due to the blocking of the at least one cylinder can advantageously be removed from the tank venting line, while maintaining the prescribed air-fuel ratio via the at least one venting path at the at least one feed point, and this purging air mass flow can be fed as a portion of the fresh air mass flow to the cylinder(s) that is/are still being supplied with fuel.

Preferably, the direct feed of fuel by means of the injectors of all of the cylinders is blocked—while deactivating a first lambda control circuit that serves to regulate the prescribed air-fuel ratio via the regulated feed of fuel by means of the injectors and via the fresh air feed of a regulated throttle element in the fresh air system—as a result of which, as a replacement, a fuel volume equivalent corresponding to the fuel volume of all of the blocked cylinders is fed in with the purging air mass flow, whereby the purging air mass flow is at its maximum in the fresh air mass flow when all of the cylinders are blocked.

According to the invention, it is provided in a first case that, if the direct feed of fuel by means of the injectors of all of the cylinders is blocked, then a second lambda control circuit is activated which, in order to regulate the prescribed air-fuel ratio, effectuates a feed of fuel via the purging air mass flow comprising the fuel volume equivalent through a regulated tank venting valve in the tank venting system, and selectively effectuates the additional regulation of the fresh air mass flow through the regulated throttle element in the fresh air system.

According to the invention, it is provided in a second case that the direct feed of fuel by means of the injector of at least one of the cylinders that are present, but not by means of the injectors of all of the cylinders, is blocked while activating the first lambda control circuit that serves to regulate the prescribed air-fuel ratio via the regulated feed of fuel by means of the injectors and via the fresh air feed of a regulated throttle element in the fresh air system, as a result of which, as a replacement, a fuel volume equivalent corresponding to the fuel volume of the blocked cylinders is fed in with the purging air mass flow, whereby the purging air mass flow is maximized in the fresh air mass flow when not all of the cylinders are blocked and when the first control circuit has been activated.

According to the invention, it is provided that the direct feed of fuel by means of the injector of at least one of the cylinders that are present, but not via the injectors of all of the cylinders, is actuated not only in the first control circuit, but additionally in the second control circuit. The advantage is that this improves the quality of the regulation.

In an advantageous manner, the method according to the invention allows the internal combustion engine to be operated and structured using various engine concepts.

In a preferred embodiment, it is provided in a first concept that, during the non-charged operation of the internal combustion engine or in the case of the appertaining structure of the internal combustion engine, the maximum or maximized purging air mass flow comprising the fuel volume equivalent is removed from a first line section that branches off from the tank venting line and then, at a first feed point, it is fed to a line section of an intake pipe downstream from the throttle valve.

In another preferred embodiment, it is provided in a second concept that, during the charged operation of the internal combustion engine, the maximum or maximized purging air mass flow comprising the fuel volume equivalent is removed from a second line section that branches off from the tank venting line and then, at a second feed point, it is fed to a line section of an intake pipe upstream from a compressor of a turbocharger.

It goes without saying that, in the second concept, load points occur that require a non-charged operation, so that, in the second engine concept, the procedure according to the first engine concept is carried out in combination. The appertaining structure of the internal combustion engine will be elaborated upon in greater detail in the description.

According to the invention, it is also provided that the maximum purging air mass flow comprising the fuel volume equivalent is at a maximum in both concepts during the idling mode of operation of the internal combustion engine when the direct feed of fuel by means of the injectors of all of the cylinders is blocked, whereby the second lambda control circuit is activated, which, in order to regulate the prescribed air-fuel ratio, regulates exclusively the fuel feed via the purging air mass flow and selectively the fresh air mass flow via the regulated throttle element in the fresh air system, as will be likewise explained in detail in the description.

Within the scope of the method, an air-fuel ratio lambda (λ)=1 is set in the appertaining control circuits.

According to the invention, the internal combustion engine is an Otto engine, whereby the appertaining lambda regulation in the Otto engine makes it possible to directly influence the total fuel volume that is injected into the cylinders of the internal combustion engine by means of the injectors.

Consequently, the internal combustion engine comprises an exhaust gas system in which a lambda probe is arranged that compares the residual oxygen content in the exhaust gas mass flow to the oxygen content of the momentary atmospheric air, so that, on this basis, the air-fuel ratio λ (ratio of combustion air to fuel) can be determined and set.

According to the invention, the internal combustion engine, encompassing a fuel system and an exhaust gas system, is designed to carry out the method explained above as well as in the description, whereby the internal combustion engine also has a control unit in which a computer-readable program algorithm for carrying out the method as well as optionally requisite characteristics are stored.

BRIEF DESCRIPTION OF THE DRAWINGS

The invention will be explained in greater detail below in an overview on the basis of FIGS. 1 and 2. The following is shown.

DETAILED DESCRIPTION OF THE INVENTION

Figure 1:
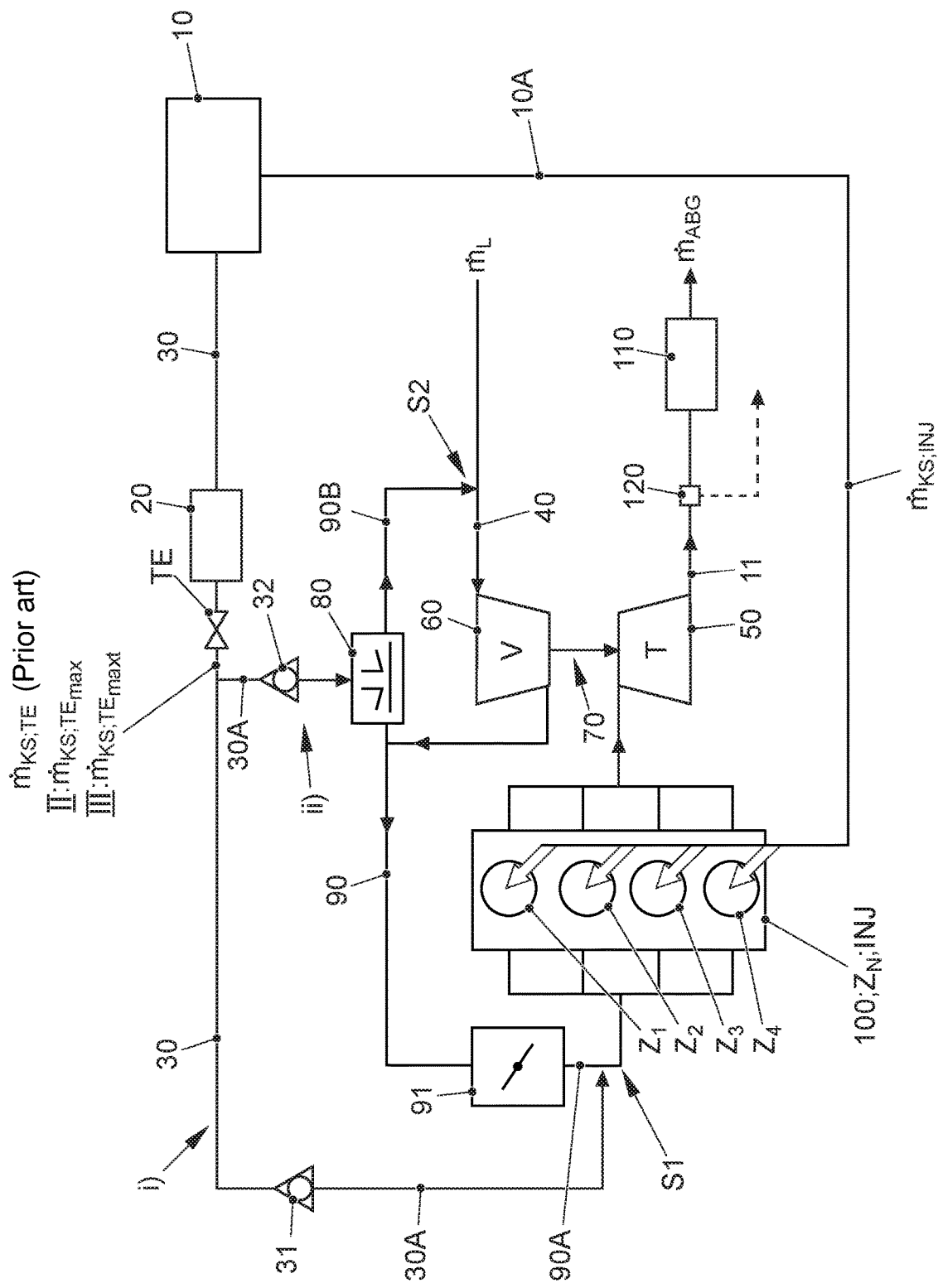
FIG. 1 is a schematic depiction of a tank venting system as a partial system of a fuel system as well as an exhaust gas system of an internal combustion engine.
Figure 2:
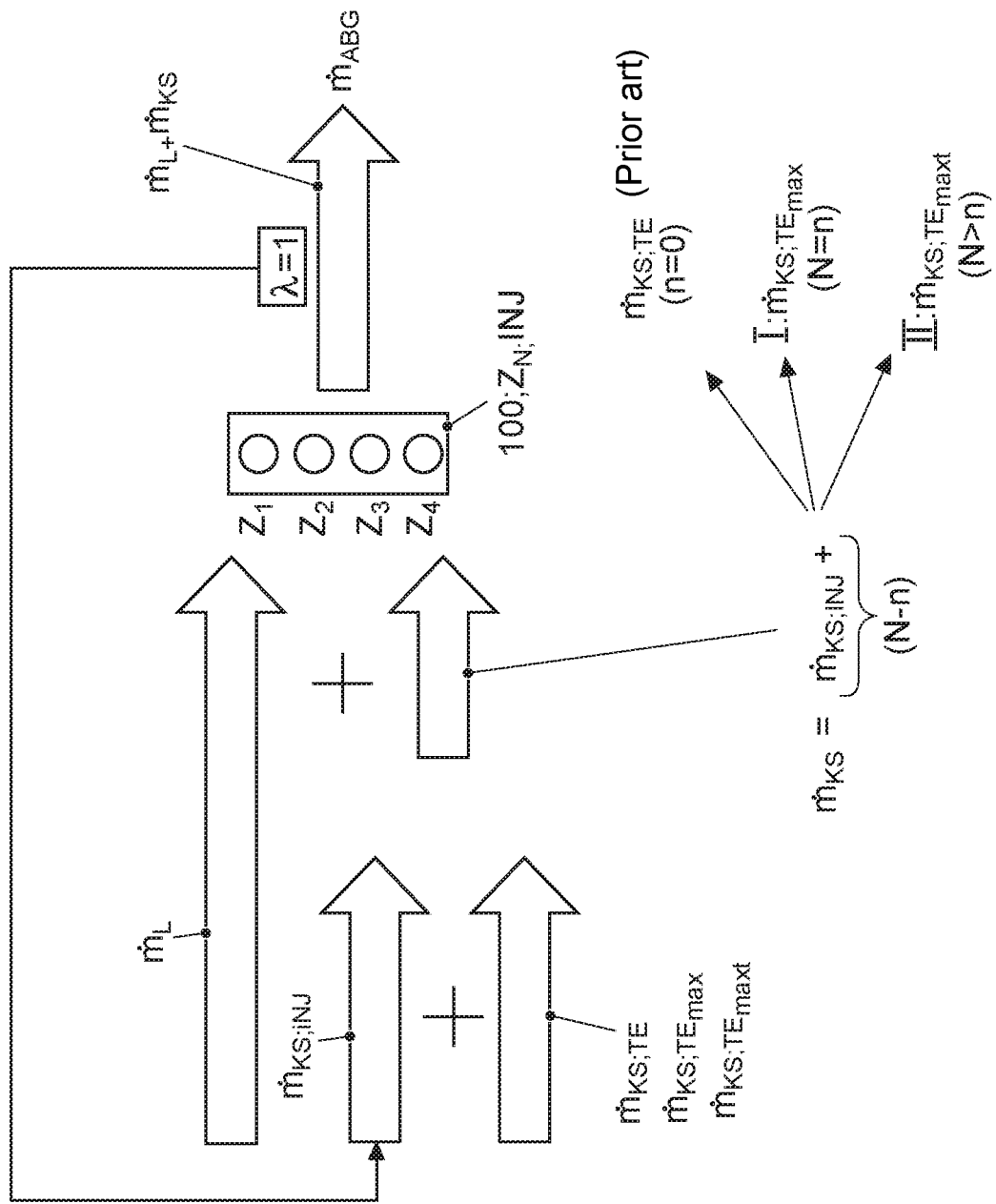
FIG. 2 is a schematic depiction of the mass flows of the tank venting system as a partial system of the fuel system and of the exhaust gas system of an internal combustion engine.

Before the backdrop of the above-mentioned publications, the invention is based on a fuel system comprising a tank venting system and an exhaust gas system, which is shown in FIG. 1.

The evaporative emissions of the tank venting system 20, 30 of the fuel system 10, which comprises a fuel tank 10 and venting lines 30; 30A, 30B, are limited by law.

FIG. 1 shows an internal combustion engine 100 as well as the fuel system 10, 20, 30 with a catalytic converter 110 that is located downstream from and close to the internal combustion engine 100 and that is part of the exhaust gas system.

According to the invention, the internal combustion engine 100 is an Otto engine, whereby the appertaining lambda regulation of the Otto engine makes it possible to directly influence the total fuel volume that is injected into the cylinders $Z_N$ of the internal combustion engine 100 by means of the injectors INJ. Consequently, the internal combustion engine 100 is associated with an exhaust gas system having an exhaust-gas line 11 in which, in addition to the at least one catalytic converter 110, there is a lambda probe 120 that compares the residual oxygen content in the exhaust gas mass flow $\dot{m}_{ABG}$ to the oxygen content of the momentary atmospheric air, so that on this basis, the air-fuel ratio λ (ratio of combustion air to fuel) can be determined and set.

Fuel vapors generated in the fuel system 10, 20, 30 are discharged from the fuel tank 10 via the tank venting system 20, 30 and then passed through an activated carbon canister 20 that serves as an intermediate storage means, so that the fuel vapors are collected in the activated carbon canister 20.

During operation of the internal combustion engine 100, the activated carbon canister 20 is purged with fresh air or emptied. During operation of the internal combustion engine 100, the purging air laden with fuel gases, especially fuel vapors, is removed from the activated carbon canister 20 via a tank venting line 30; 30A, 30B and conveyed to the combustion step.

In a known manner, the fuel is fed through fuel supply lines 10A to the injectors INJ of the cylinders $Z_N$ of the internal combustion engine 100.

When mention is made below of purging air or purging air mass flow $\dot{m}_{KS;TE}$, this refers to the fresh air $\dot{m}_L$ of the so-called fresh air path that is laden with fuel vapors which are purged from the activated carbon canister 20 and conveyed to the combustion step via the tank venting line 30;

30A, 30B during operation of the internal combustion engine 100, whereby the quantity of purging air fed to the internal combustion engine 100 corresponds to the purging air mass flow $\dot{m}_{KS;TE}$ which altogether constitutes a partial mass flow of the combustion air $\dot{m}_L$ that is fed to the cylinders $Z_N$ of the internal combustion engine 100.

As is shown in FIG. 1, in the non-charged engine concepts a), it is provided for the activated carbon canister 20 to be purged and emptied via the line section 30A of the tank venting line 30 (feed point S1) into the line section 90A of the intake pipe 90 that is downstream from a throttle valve 91 and that is close to the intake system of the internal combustion engine 100. This route for the purging and emptying of the activated carbon canister 20 via the line section 30A will be designated below as venting path i).

In the area 90A of the intake pipe 90 downstream from the throttle valve 91, during operation, a pressure always prevails which depends on the opening angle of the throttle valve 91 and which is negative relative to the activated carbon canister 20, thereby causing the purging air mass flow $\dot{m}_{KS;TE}$ to flow in the direction of the intake system of the internal combustion engine 100. A non-return valve 31 located in the line section 30A prevents a flow in the reverse direction.

The negative pressure in the line section 90A of the intake pipe 90 downstream from the throttle valve 91—concurrently with the opening of a venting valve TE in the tank venting line 30 that responds to the negative pressure—is employed to generate a purging air mass flow $\dot{m}_{KS;TE}$ out of the activated carbon canister 20. This approach, which is also referred to as low-pressure tank venting a) via the venting path i), has the drawback that it only generates small mass flows so that the purging air mass flow $\dot{m}_{KS;TE}$ that can be achieved as a partial mass flow of the combustion air $\dot{m}_L$ is only small.

In the charged engine concepts b), as a function of the load point, for purposes of venting the tank, a purging air mass flow $\dot{m}_{KS;TE}$, being added to the intake air of the internal combustion engine 100, is fed via the venting path i) described in a) as shown in FIG. 1 by means of a turbocharger 70 (compressor 60 and turbine 50) via a Venturi tube 80 into the intake pipe 40 that is arranged on the suction side of the compressor 60. The Venturi tube 80, which is charged with a partial mass flow of the fresh air $\dot{m}_L$ of the fresh air path downstream from the compressor V, generates a negative pressure in a line section 30B of the tank venting line 30 and thus in the tank venting line 30. A line section 90B situated behind the Venturi tube 80 is connected to the intake pipe 40 (feed point S2), whereby a pressure gradient always prevails in the direction of the intake pipe 40 between the output side of the Venturi tube 80 and the intake pipe 40.

Thus, in charged engine concepts b), the Venturi tube 80—concurrently with the opening of a venting valve TE in the tank venting line 30 that responds to the negative pressure—is employed to generate a purging air mass flow $\dot{m}_{KS;TE}$ out of the activated carbon canister 30, and this purging air mass flow $\dot{m}_{KS;TE}$ is fed into the intake pipe 40 together with the partial mass flow of the fresh air $\dot{m}_L$ of the fresh air path. A non-return valve 32 in the line section 30B prevents a flow in the reverse direction. Therefore, this approach, which is also referred to as high-pressure tank venting, is carried out via the Venturi tube 80, whereby the associated venting path is designated as ii). In the case of this second venting path ii), only small mass flows are generated, whereby the purging air mass flow KS;TE of the second venting path ii) that can be achieved as a partial mass flow of the combustion air $\dot{m}_L$ is even smaller as compared to the first venting path i).

In this context, when compared to a feed without auxiliary means, the Venturi tube 80 constitutes an efficient measure for increasing the purging air mass flow $\dot{m}_{KS;TE}$. In order to increase the purging air mass flow $\dot{m}_{KS;TE}$ in the second venting path ii), an ejector pump or other approaches are proposed as alternatives which utilize physical principles such as, for instance, pressure differentials, to generate the purging air mass flow $\dot{m}_{KS;TE}$ in the second venting path ii) coming out of the activated carbon canister 20 and entering the intake pipe 40.

In the case of charged engine concepts b), the connection pipe that was previously referred to as the intake pipe 90 and that is located between the compressor 60 and the internal combustion engine 100 is charged and also referred to as a pressure pipe since, when the connection pipe between the compressor 60 and the internal combustion engine 100 is charged, the area 90A situated downstream from the throttle valve 91 exhibits an excess pressure that is higher than the pressure in the line section 30A of the tank venting line 30, depending on the opening angle of the throttle valve 91 relative to the activated carbon canister 20. This means that the venting path i) is only active at those load points at which the compressor 60 of the turbocharger 70 is not in operation.

In other words, in the case of the non-charged concepts a), the tank can be vented at all load points exclusively via the first venting path i) while, in the charged concepts b), the tank can be vented via the first venting path i) at all load points at which the compressor 60 of the turbocharger 70 is not in operation, and the tank can be vented exclusively via the second venting path ii) at those load points at which the compressor 60 of the turbocharger 70 is in operation.

In other words, since the compressor 60 of the turbocharger 70 is not in operation at all load points, the tank cannot be vented via the second venting path ii) when the turbocharger 70 is out of operation, for example, when the internal combustion engine 100 is in the idling mode of operation.

Both concepts a) and b) require a running internal combustion engine 100 so that, while the internal combustion engine 100 is in operation, the load-dependent negative pressure is formed in the line section 30A (venting path i) or in the line section 30B (venting path ii) and thus in the tank venting line 30 upstream from the sites that branch off from the line sections 30A, 30B.

If the running time of the internal combustion engine 100 is reduced by hybrid or start-stop systems, as is currently normal practice, the amount of purging air—and consequently the purging air mass flow $\dot{m}_{KS;TE}$ as the partial mass flow of the combustion air $\dot{m}_L$ that can be generated via the venting paths i) and ii)—also drops automatically.

In order to increase the purging air mass flow $\dot{m}_{KS;TE}$, a technique is known in which a separate pump (not shown here) is used to purge the activated carbon canister 20. It is disadvantageous that the operation of the pump necessitates an appertaining regulation and control program as well as monitoring components. This renders the tank venting system of the fuel system even more complex and costly.

For purposes of avoiding the need for additional components and so as to not raise this already very high level of system complexity, efforts are aimed at finding a solution to increase the purging air mass flow $\dot{m}_{KS;TE}$ in a different manner, a process in which the following situation needs to be taken into account.

Assuming a stoichiometric combustion at λ=1, a drop in the fuel mass flow $\dot{m}_{KS;INJ}$ of the fuel that is injected into the injectors INJ via the fuel path is brought about by feeding purging air laden with hydrocarbons (fuel vapors) into the amount of fresh air of the fresh air path that has been provided in the fresh air mass flow $\dot{m}_L$ as combustion air for the combustion and that has been fed in as a function of a load point of the internal combustion engine 100.

Here, especially at one load point encountered during the idling mode of operation, the minimal available injection time $ti_{min}$ of the employed injectors INJ is prescribed as a function of the number N of cylinders (N=1, 2, 3, etc.). In other words, the injection time $ti_{min}$ cannot be further shortened in order to feed in a larger fuel volume equivalent via the venting path i) during the idling mode of operation.

Therefore, during the idling mode of operation, the minimal available injection time $ti_{min}$ of the injectors INJ as a function of the number of cylinders N (N=1, 2, 3, etc.) limits the purging air mass flow KS;TE that can be conveyed to the combustion step along with the combustion air via the venting path i).

It has been theoretically proven previously that the fuel volume in the purging air mass flow $\dot{m}_{KS;TE}$ as part of the fresh air mass flow $\dot{m}_L$ would be sufficient to ensure the operation of the internal combustion engine 100 at the load point encountered during the idling mode of operation, at least for a certain period of time during which the purging air mass flow $\dot{m}_{KS;TE}$ is laden with a sufficient amount of fuel vapor.

Purging Air Mass Flow $\dot{m}_{KS;TE}$ so Far:

Therefore, at the load points of the internal combustion engine 100, the purging air mass flow $\dot{m}_{KS;TE}$, as a portion of the fresh air mass flow $\dot{m}_L$ of the fresh air path, depends on the fuel injection in all of the cylinders N of the internal combustion engine 100 at the appertaining injection time ti of the injectors INJ as a function of the number N of cylinders (N=1, 2, 3, etc.), as illustrated by formula [1].

Formula [1] applies:

$$\dot{m}_{ABG} = \dot{m}_L + \dot{m}_{KS} = \dot{m}_L + [\dot{m}_{KS;INJ} + \dot{m}_{KS;TE}] \quad [1]$$

The total exhaust gas mass flow $\dot{m}_{ABG}$ at each load point comprises the fresh air mass flow $\dot{m}_L$ of the fresh air path and the total fuel mass flow $\dot{m}_{KS}$ which consists of the fuel mass flow $\dot{m}_{KS;INJ}$ injected by means of the injectors INJ and of the purging air mass flow $\dot{m}_{KS;TE}$ as the partial mass flow of the fresh air mass flow $\dot{m}_L$.

The purging air mass flow $\dot{m}_{KS;TE}$ as a portion of the fresh air mass flow $\dot{m}_L$ of the fresh air path is limited at the critical load point encountered during the idling mode of operation of the internal combustion engine 100 due to the injection into all of the cylinders $Z_N$ of the internal combustion engine 100 at the minimal injection time $ti_{min}$ of the injectors INJ as a function of the number N of cylinders (N=1, 2, 3, etc.) and cannot be increased any more if needed.

A fundamental limitation encountered with the operation of an Otto engine is also the fact that an Otto engine can only be operated stoichiometrically. In this context, however, it is possible for individual cylinders $Z_N$ to be operated with a richer mixture (with an excess of fuel) or with a leaner mixture (with an excess of air).

Therefore, the burned fuel contained in the total exhaust gas mass flow $\dot{m}_{ABG}$ of the exhaust gas consists of the fuel mass flow $\dot{m}_{KS;INJ}$ injected by means of the injectors INJ and of the fuel in the purging air mass flow $\dot{m}_{KS;TE}$.

This means that the maximal purging air mass flow $\dot{m}_{KS;TE;max}$ that is fed as a portion of the fresh air mass flow $\dot{m}_L$ into the cylinders $Z_N$ (each with an injector INJ per cylinder $Z_N$) at the load point of the internal combustion engine 100 depends on the fresh air mass flow $\dot{m}_L$ needed at the load point.

In summary, at the load point encountered during the idling mode of operation, the injection time $ti_{min}$ of the injectors INJ is minimal, so that only a minimal fuel mass flow $\dot{m}_{KS;INJ}$ can be injected by means of the injectors INJ and thus also only a minimal purging air mass flow $\dot{m}_{KS;TE}$ can be discharged from the tank venting line 30 via the venting paths i) and ii) along with the combustion air $\dot{m}_L$, whereby said purging air mass flow $\dot{m}_{KS;TE}$ might not be sufficient to adequately purge the activated carbon canister 20. Moreover, in the case of the hybrid and/or start-stop systems, the time during which the internal combustion engine 100 is in the idling mode of operation is reduced even further.

Case I According to the Invention: Maximal Purging Air Mass Flow $\dot{m}_{KS;TE;Max}$:

As already explained, it has been recognized and proven that the operation of the internal combustion engine 100, especially at the load point encountered during the idling mode of operation, is possible exclusively, at least at times, via the fuel volume in the purging air mass flow $\dot{m}_{KS;TE}$ as part of the fresh air mass flow $\dot{m}_L$, so that in such a case, a maximal fuel-purging air mass flow $\dot{m}_{KS;TE;max}$ can be discharged via all of the cylinders $Z_N$, while exclusively burning the fuel in the purging air mass flow $\dot{m}_{KS;TE}$.

These considerations reveal that, in order to increase the fuel-purging air mass flow $\dot{m}_{KS;TE}$, the fuel injection by means of the injectors INJ of all of the cylinders $Z_N$ can be completely blocked.

In other words, the injection of fuel via all of the injectors INJ of the internal combustion engine 100 is completely blocked, at least for a prescribable period of time that is needed to purge the activated carbon filter 20, thereby increasing the purging air mass flow $\dot{m}_{KS;TE;max}$ via the first venting path i).

This approach is referred to as the complete blocking of all of the cylinders $Z_N$, whereby the term "complete blocking" means that the appertaining injector INJ of the blocked cylinders $Z_N$ no longer injects fuel and is thus completely blocked.

Whenever needed, this approach achieves a maximal increase in the fuel-purging air mass flow $\dot{m}_{KS;TE;max}$ by completely blocking the injection of fuel by means of all of the injectors INJ.

Such a need exists when a sufficient purging air mass flow $\dot{m}_{KS;TE}$ for cleaning the activated carbon canister 20 can no longer be discharged from the tank venting line 30 via the combustion air $\dot{m}_L$—assuming that fuel is being injected by means of all of the injectors INJ at a given load point and assuming that the stoichiometric fuel-air mixture of the internal combustion engine 100, especially lambda λ>1, can be ensured via at least one of the venting paths i), ii).

The fuel portion of the fuel-air mixture is reduced due to the complete blocking, at least at times, of the injection of all of the cylinders $Z_N$ in the manner of a technically regulated switching off of the opening function of the injection openings of all of the injectors INJ. As a result, the internal combustion engine 100 is altogether changed towards a leaner mixture, so that the lambda value λ measured in the exhaust gas mass flow is greater than 1 since an excess of air is present when lambda λ>1.

The term "altogether changed towards a leaner mixture" refers to the detection of an excess of air measured at the output of the internal combustion engine 100, whereby it is not explicitly detected which of the cylinders $Z_N$ is altogether (totally) responsible for the leaner mixture, that is to say, the reduction of the fuel feed.

With such a minimal injection time $ti_{min}$, it is theoretically possible to achieve a maximal increase in the previous purging air mass flow $\dot{m}_{KS;TE}$ of $n*ti_{min}$, whereby n stands for the number of blocked cylinders $Z_N$ having the number N (N=1, 2, 3, etc.).

In this case I according to the invention, all of the cylinders $Z_N$ are completely blocked, so that n=N.

On the basis of formula [1], wherein n=N and assuming the minimal injection time $ti_{min}$ for the injectors INJ, the following formula [2] applies:

$$\dot{m}_{ABG}=\dot{m}_L+\dot{m}_{KS}=\dot{m}_L+[N-n;n=N]*\dot{m}_{KS;INJ,min}+\dot{m}_{KS;TE}] \quad [2]$$

In this case I according to the invention, $\dot{m}_{KS;TE}$ is maximally $\dot{m}_{KS;ME;max}$, since a maximal purging air mass flow $\dot{m}_{KS;TE;max}$ can be conveyed to the combustion step, due to the fact that all of the cylinders $Z_N$ are completely blocked. In order to be able to ensure an exhaust-gas lambda $\lambda=1$ through technical regulation, the air mass flow $\dot{m}_L$ is achieved by reducing the opening angle of the throttle valve 91 all the way to a complete closure of the throttle valve.

However, in the case of a complete blocking of all of the cylinders $Z_N$, the total exhaust gas $\dot{m}_{ABG}$ cannot be easily regulated to a value of lambda $\lambda=1$, in other words, to a stoichiometric composition using the control variables on hand since, during normal operation, the regulation of lambda to an exhaust gas value of lambda $\lambda=1$ is done through the injection by means of the injectors INJ on the cylinders $Z_N$. In other words, the regulation path is interrupted for the period of time of the described complete blocking of the injectors INJ of all (N=n) of the cylinders $Z_N$.

According to the invention, during this period of time, a new regulation path can become active in order to regulate the total exhaust gas $\dot{m}_{ABG}$ to $\lambda=1$, thus ensuring that the fuel volume needed to obtain the desired stoichiometric composition, especially $\lambda=1$, is effectuated through the regulation of the amount of purging air mass flow $\dot{m}_{KS;TE}$ by regulating the tank venting valve TE.

It is being proposed that the change towards a leaner mixture—which is brought about when all of the cylinders $Z_N$ are blocked—be compensated for by opening the tank venting valve TE (the throttle valve 91 is closed or shut at the same time) and by increasing the feed of purging air $\dot{m}_{KS;TE}$ towards lambda $\lambda=1$, so that, when the purging air mass flow $\dot{m}_{KS;TE}$ is increased, a larger fuel volume (richer fuel-air mixture) is fed in, corresponding to the fuel volume equivalent of the fuel volume KS;INJ, min that would otherwise have been injected by means of the injectors INJ of the cylinder $Z_N$, which are now completely blocked. This possible new regulation path, however, is relatively sluggish, so that the following approach has been devised and is being proposed as a preferred embodiment.

Case II According to the Invention: Maximized Purging Air Mass Flow $\dot{m}_{KS;TE;maxt}$:

When necessary, the previous purging air mass flow $\dot{m}_{KS;TE}$ is not generated as a maximal purging air mass flow $\dot{m}_{KS;TE;max}$, but rather, it is maximized as follows.

Based on the above-mentioned technical-regulation considerations, it has been found out that, if necessary, a complete blocking of the fuel injection by means of the injector INJ of at least one of the cylinders $Z_N$ present but not of all of the cylinders $Z_N$ (N>n) is carried out in order to increase the fuel-purging air mass flow $\dot{m}_{KS;TE}$, so that in comparison to the above-mentioned approach, when one or more, but not all of the cylinders $Z_N$ (N>n) are blocked, less of a change towards a leaner mixture of the fuel-air mixture of the internal combustion engine 100 is attained now.

Therefore, in the preferred embodiment, it is provided that the number n (n (n=1, 2, 3, etc.) of the completely blocked cylinders $Z_N$ is always smaller (n<N) than the number N (N=1, 2, 3, etc.) of the cylinders present, whereby one cylinder $Z_N$ (n=1) or several cylinders (n=2, n=3, etc.) can be blocked, resulting in the effect described below.

Due to the complete blocking of the injection into at least one cylinder $Z_N$ in the manner of a technically regulated switching off of the opening function of the injection opening(s) of the appertaining INJ, the portion of fuel corresponding to the number n of completely blocked cylinders $Z_N$ of the fuel-air mixture is reduced.

As a result, the internal combustion engine 100 is likewise altogether changed towards a leaner mixture, so that the lambda value $\lambda$ measured in the exhaust gas mass flow is greater than 1 since there is an excess of air when lambda $\lambda>1$. The overall change towards a leaner mixture, however, turns out to be less in this case II according to the invention as compared to case I because at least one of the cylinders $Z_N$ is not blocked.

As a function of the number n of the blocked cylinders, in this case II, an additional fuel volume equivalent can likewise be fed in via the purging air mass flow $\dot{m}_{KS;TE}$ by means of the overall change made towards a leaner mixture according to the invention, as a result of which, depending on the number n of blocked cylinders $Z_N$, a maximized dischargeable fuel-purging air mass flow $\dot{m}_{KS;TE;max}t$ is generated at the minimal injection $ti_{min}$, especially at the critical load point encountered during the idling mode of operation. Since it is always the case that at least one cylinder $Z_N$ is not blocked, that is to say, it is actively injecting, the stoichiometric fuel-air mixture can be regulated to $\lambda=1$ via the conventional regulation path while the fuel volume KS;INJ injected by means of the at least one active cylinder $Z_N$ is influenced.

On the basis of formula [1], with n<N and assuming the minimal injection time $ti_{min}$, the following formula [3] applies:

$$\dot{m}_{ABG}=\dot{m}_L+\dot{m}_{KS}=\dot{m}_L+[(N-n;n>N)*\dot{m}_{KS;INJ;min}+\dot{m}_{KS;TE}] \quad [3]$$

In this case II according to the invention, the purging air mass flow $\dot{m}_{KS;TE}$ that could be generated up until now is maximized $\dot{m}_{KS;TE;maxt}$, since a maximized purging air mass flow $\dot{m}_{KS;TE;maxt}$ can be conveyed to the combustion step as a function of the number n of completely blocked cylinders $Z_N$.

For purposes of ensuring an exhaust gas lambda $\lambda=1$, the air mass flow $\dot{m}_L$ is achieved by reducing the opening angle of the throttle valve 91 all the way to a complete closure of the throttle valve. In other words, in order to ensure an exhaust gas lambda $\lambda=1$ via the previous faster regulation path, the air mass flow $\dot{m}_L$ is adapted as a function of the number n of blocked cylinders $Z_N$ in that the opening angle of the throttle valve 91 is adjusted all the way to a complete closure of the throttle valve 91.

Therefore, it is not the maximally possible dischargeable fuel-purging air mass flow $\dot{m}_{KS;TE}$;max that is fed via the purging air mass flow to the internal combustion engine 100, but rather it is a maximized dischargeable fuel-purging air mass flow $\dot{m}_{KS;TE;maxt}$ as the additional fuel volume equivalent.

Now, in spite of a complete blocking of at least one or more cylinders $Z_N$ (but not all of the cylinders $Z_N$), it is once again easily possible to regulate the total exhaust gas $\dot{m}_{ABG}$ to a value of lambda λ=1, in other words, to a stoichiometric composition of the fuel-air mixture, since the lambda regulation is done through the injection by means of the at least one injector INJ of at least one non-blocked cylinder $Z_N$. In other words, the regulation path is no longer interrupted for the period of time of the described complete blocking of at least one injector INJ or of some of the injectors INJ that are present.

It goes without saying that a combined regulation algorithm can be set up for the regulations via the new and the previous regulation paths.

Ideally, the internal combustion engine 100 is advantageously operated in such a way that, at the load point encountered during the idling mode of operation, the non-blocked (N−n) cylinder(s) $Z_N$ that is/are injected via the injector(s) INJ is/are operated with an injection time or injection times that is/are greater than the minimal injection time $ti_{min}$, as a result of which the quality of the mixture regulation is improved.

Irrespective of the load point encountered during the idling mode of operation, at which the non-blocked (N−n) cylinder(s) $Z_N$ is/are injected via the injector(s) INJ, the cylinder(s) $Z_N$ is/are operated with an injection time or injection times that (as a function of the desired fuel-air mixture) is/are greater than the injection time that is normally used at a given load point when there is no blocking of at least one of the cylinders $Z_N$ (N−n), as a result of which the quality of the mixture regulation is likewise advantageously improved.

If the internal combustion engine 100 is operated at a load point at which the fresh air mass flow $\dot{m}_L$ is charged, as is the case with the described engine concepts b), the possibility only exists to vent the tank via the first venting path i) that is active at the charged load points of the internal combustion engine 100.

According to the invention, the fuel system of the internal combustion engine 100 is configured to carry out the above-mentioned method for venting the tank or the method for increasing the tank venting purging quantity $\dot{m}_{KS;TE;max}$; $\dot{m}_{KS;TE;maxt}$ by completely blocking the injection of at least one cylinder $Z_N$. For this purpose, the fuel system of the internal combustion engine 100 comprises a control unit in which a computer-readable program algorithm for carrying out the method as well as optionally requisite characteristics are stored.

LIST OF REFERENCE NUMERALS

K fuel system
10 fuel tank
10A fuel supply line
11 exhaust-gas line
20 activated carbon filter
30 venting line
30A line section
30B line section
31 non-return valve
32 non-return valve
TE venting valve
40 intake pipe
50 turbine
60 compressor
70 turbocharger
80 Venturi tube
90 intake pipe
90A line section
90B line section
91 throttle valve
100 internal combustion engine
110 catalytic converter
120 lambda probe
$\dot{m}_{ABG}$ total exhaust gas mass flow
$\dot{m}_L$ fresh air mass flow
$\dot{m}_{KS}$ total fuel mass flow
$\dot{m}_{KS;INJ}$ fuel mass flow via injectors of the cylinders
$\dot{m}_{KS;TE}$ purging air mass flow via the air path (state of the art)
$\dot{m}_{KS;TE;max}$ maximal dischargeable purging air mass flow
$\dot{m}_{KS;TE;maxt}$ maximized dischargeable purging air mass flow
$ti_{min}$ minimal injection time of an injector
i first venting path
ii second venting path
INJ injector
Z cylinder
N number of cylinders
$Z_N$ $N^{th}$ cylinder
n number of completely blocked cylinders

The invention claimed is:

1. A method for operating an internal combustion engine comprising a plurality of cylinders; a fuel system comprising a tank venting system, which includes a tank venting line interconnected by a tank venting valve; and a fresh air system, the method comprising:
   directly feeding fuel, in a fuel mass flow, via a fuel supply line of the fuel system to the cylinders at a prescribed air-fuel ratio by injectors of the fuel system;
   feeding fresh air, in a fresh air mass flow, via a fresh air system;
   connecting the tank venting line via the tank venting valve to at least one line section of the fresh air system via at least one feed point, thereby forming at least one venting path;
   venting the fuel tank of the tank venting system via the at least one venting path by a negative pressure relative to the tank venting line which prevails at the at least one feed point and which is dependent on the load point;
   removing a first purging air mass flow from the tank venting system, wherein the first purging air mass flow contains fuel;
   feeding the removed first purging air mass flow to the cylinders as a portion of the fresh air mass flow, so that a total fuel mass flow is fed into the cylinders directly by the injectors as well as indirectly via the fresh air mass flow;
   blocking the direct feed of fuel by at least one injector of at least one of the cylinders;
   removing a second purging air mass flow comprising a first fuel volume equivalent that is absent due to the blocking of the at least one cylinder from the tank venting line, while maintaining the prescribed air-fuel ratio via the at least one venting path at the at least one feed point; and
   feeding the removed second purging air mass flow, as a portion of the fresh air mass flow, to the cylinder(s) that is/are still being supplied with fuel.

2. The method according to claim 1, further comprising:
   deactivating a first lambda control circuit while blocking the direct feed of fuel by injectors of all of the cylinders, wherein the first lambda control circuit is configured to regulate the prescribed air-fuel ratio via the regulated feed of fuel by the injectors and via the fresh air feed of a regulated throttle element in the fresh air system, and
   feeding, as a replacement, a second fuel volume equivalent corresponding to a fuel volume of all of the blocked cylinders is fed in with the purging air mass flow, whereby the second purging air mass flow is at its maximum in the fresh air mass flow when all of the cylinders are blocked.

3. The method according to claim 2, further comprising, if the direct feed of fuel by the injectors of all of the cylinders is blocked, then:
   activating a second lambda control circuit; and
   regulating, via the activated second lambda control circuit, the prescribed air-fuel ratio by:
      effectuating a second feed of fuel, via the purging air mass flow, through a regulated tank venting valve in the tank venting system, wherein the second feed of fuel comprises the second fuel volume equivalent; and
      selectively effectuating the additional regulation of the fresh air mass flow through the regulated throttle element in the fresh air system.

4. The method according to claim 1, further comprising:
   activating a first lambda control circuit while blocking the direct feed of fuel by the at least one injector of at least one of the cylinders, but not, by the injectors of all of the cylinders;
   regulating, via the activated first lambda control circuit, the prescribed air-fuel ratio via the regulated feed of fuel by the injectors and via the fresh air feed of a regulated throttle element in the fresh air system;
   feeding, via the activated first lambda control circuit, a replacement, a second fuel volume equivalent corresponding to the fuel volume of the blocked cylinders in with the purging air mass flow, whereby the purging air mass flow is maximized in the fresh air mass flow when not all of the cylinders are blocked.

5. The method according to claim 4, further comprising:
   regulating, via a second lambda control circuit, the prescribed air-fuel ratio by:
      effectuating a second feed of fuel, via the purging air mass flow, through a regulate tank venting valve in the tank venting system, wherein the second feed of fuel comprises the second fuel volume equivalent; and
      selectively effectuating the additional regulation of the fresh air mass flow through the regulated throttle element in the fresh air system.

6. The method according to claim 1, further comprising, during a non-charged operation of the internal combustion engine:
   removing a maximum or maximized purging air mass flow from a first line section that branches off from the tank venting line, wherein the maximum or maximized purging air mass flow comprises the first fuel volume equivalent; and
   feeding the removed maximum or maximized purging air mass flow, at a first feed point, to a line section of an intake pipe downstream from the throttle valve.

7. The method according to claim 1, further comprising, during a charged operation of the internal combustion engine:
   removing a maximum or maximized purging air mass flow from a second line section that branches off from the tank venting line; and
   feeding the removed maximum or maximized purging air mass flow, at a second feed point, to a line section of an intake pipe upstream from a compressor of a turbocharger.

8. The method according to claim 3, further comprising:
   regulating the prescribed air-fuel ratio, via the activated second lambda control unit, by:
      exclusively regulating the fuel feed via the second purging air mass flow, and
      selectively regulating the fresh air mass flow via the regulated throttle element in the fresh air system;
   wherein the second purging air mass flow is at its maximum, in both a non-charged operation and a charged operation of the internal combustion engine, during the idling mode of operation of the internal combustion engine when the direct feed of fuel by injectors of all of the cylinders is blocked.

9. The method according to claim 6,
   activating a second lambda control circuit to regulate the prescribed air-fuel ratio by:
      exclusively regulating the fuel feed via the purging air mass flow, and
      selectively regulating the fresh air mass flow via the regulated throttle element in the fresh air system;
   wherein the second purging air mass flow is at its maximum, in both a non-charged operation and a charged operation of the internal combustion engine, during the idling mode of operation of the internal combustion engine when the direct feed of fuel by injectors of all of the cylinders is blocked.

10. The method according to claim 1, wherein the prescribed air-fuel ratio=1.

11. An internal combustion engine comprising:
   a plurality of cylinders;
   a fuel system comprising:
      injectors,
      a fresh air system, via which fresh air is fed in a fresh air mass flow,
      a tank venting system, which includes a tank venting line interconnected by a tank venting valve, wherein the tank venting line is connectable to at least one line section of the fresh air system via at least one feed point to form at least one venting path, and
      a fuel supply line, via which, fuel is fed in a fuel mass flow to the plurality of cylinders at a prescribed air-fuel ratio by the injectors; and
   a control unit configured to:
      vent the fuel tank of the tank venting system via the at least one venting path by a negative pressure relative to the tank venting line which prevails at the at least one feed point and which is dependent on the load point;
      remove a first purging air mass flow from the tank venting system, wherein the first purging air mass flow contains fuel;
      feed the removed first purging air mass flow to the cylinders as a portion of the fresh air mass flow, so that a total fuel mass flow is fed into the cylinders by means of the injectors as well as indirectly via the fresh air mass flow;
      remove a second purging air mass flow comprising a first fuel volume equivalent that is absent due to the blocking of the at least one cylinder from the tank venting line, while maintaining the prescribed air-fuel ratio via the at least one venting path at the at least one feed point; and
      feed the removed second purging air mass flow, as a portion of the fresh air mass flow, to the cylinder(s) that is are still being supplied with fuel.

12. The internal combustion engine according to claim 11, wherein the internal combustion engine is an Otto engine.

* * * * *